(No Model.)
A. DUNCAN.
SELF HIVING BEEHIVE.
No. 590,366. Patented Sept. 21, 1897.
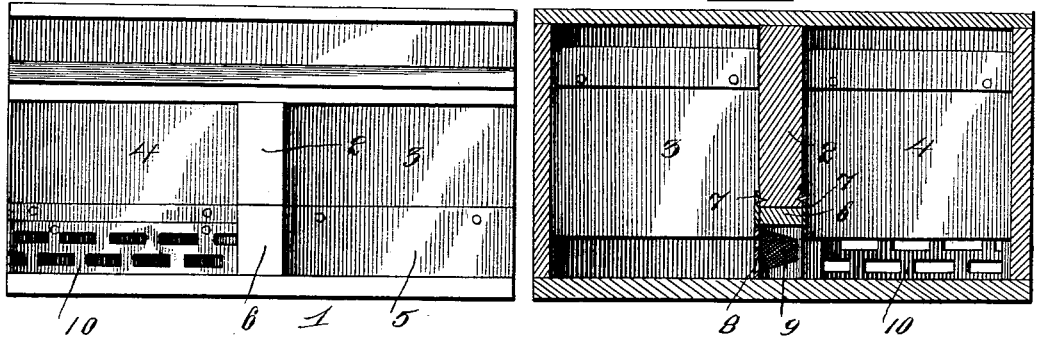
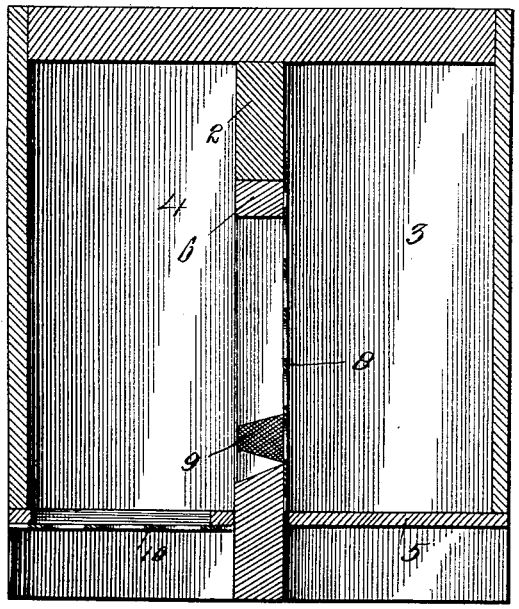
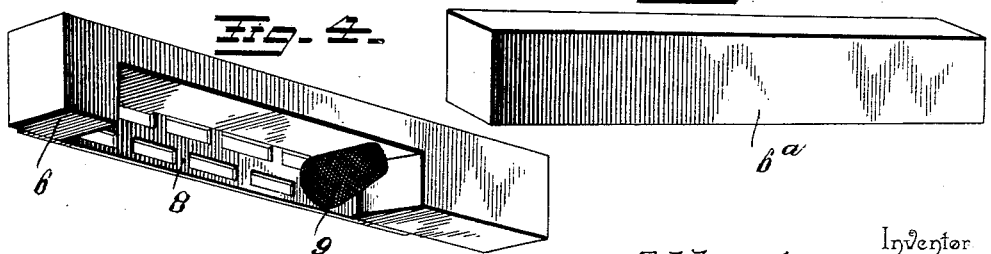
Witnesses
H. J. Koerth.
H. F. Riley.
Inventor
Albert Duncan,
By his Attorneys,
C. A. Snow & Co.

UNITED STATES PATENT OFFICE.

ALBERT DUNCAN, OF DUPONT, GEORGIA.

SELF-HIVING BEEHIVE.

SPECIFICATION forming part of Letters Patent No. 590,366, dated September 21, 1897.

Application filed November 15, 1895. Serial No. 569,092. (No model.)

*To all whom it may concern:*

Be it known that I, ALBERT DUNCAN, a citizen of the United States, residing at Dupont, in the county of Clinch and State of Georgia, have invented a new and useful Self-Hiving Beehive, of which the following is a specification.

The invention relates to improvements in beehives.

The object of the present invention is to provide a self-hiving beehive which will be adapted to prevent bees from swarming away from the hive and which will enable a queen bee to be conducted to a separate compartment and confined therein to cause the swarm of bees to return and settle in such compartment.

The invention consists in the construction and novel combination and arrangement of parts hereinafter fully described, illustrated in the accompanying drawings, and pointed out in the claim hereto appended.

In the drawings, Figure 1 is a front elevation of a hive constructed in accordance with this invention. Fig. 2 is a horizontal sectional view of the same. Fig. 3 is a transverse sectional view. Fig. 4 is a detail perspective view of the slide which carries the queen-bee trap. Fig. 5 is a similar view of a solid slide.

Like numerals of reference designate corresponding parts in all the figures of the drawings.

1 designates a hive provided with a central vertical longitudinal partition 2, forming two compartments 3 and 4, which are designed to contain ordinary brood-frames. The hive may also be provided with a super or honey box and honey-sections, but as such constructions do not form a part of the present invention they have been omitted.

The hive is designed to be first used with one of the compartments vacant. This may be accomplished by closing the entrance to such compartment, and such chamber will be found convenient as a store-room.

When the bees show signs of swarming, the entrance to the hive-compartment 3, which is supposed to be occupied by the colony, is temporarily closed by an imperforate closing-strip 5, and the workers are conducted or caused to enter the other compartment 4 by means of a slide 6, which is adapted to be arranged in suitable ways in a longitudinal opening of the partition 2, such ways being preferably formed by plates 7, secured to opposite faces of the partition. The slide is recessed and has secured to it at its recess a queen-bee-excluding strip 8, having the usual openings of a size to permit the passage of the workers, but to prevent the passage of a queen bee. At one end of the strip is located a queen-bee trap 9, consisting of a tapering tubular or truncated conical body constructed of wire-gauze or similar material. The queen bee is adapted to pass readily through the trap from the enlarged end, but after passing through into the compartment 4 she will be unable to find or pass through the trap from the reduced end. A queen-excluding strip 10 is secured over the entrance to the compartment 4 and is provided with the usual openings for the passage of the workers, and by this arrangement the queen bee is confined within the empty compartment.

It has been found by experience that a swarm of bees on leaving the hive and finding themselves unaccompanied by the queen will return to the hive and locate in the empty compartment wherein the queen is temporarily confined, and that some of the bees will remain in the compartment 4 and others return to the original brood-chamber in the compartment 3. The strip 5 may then be removed from the entrance of the compartment 3 and the slide 6 be replaced by the solid slide 6ª, and thus each compartment will be occupied.

It will be seen that the hive is exceedingly simple and inexpensive in construction, that it is adapted to prevent bees from swarming away from it, and that the empty compartment or chamber 4 can be advantageously employed for rearing queens, for feeding, and the like, and the culls taken from the super or honey box, when used over the brood-compartment 3, may be placed in the empty chamber, thereby causing the bees to take honey from the culls and finish the sections in the super, which is placed in communication with the compartment 3 in any of the well-known ways.

Changes in the form, proportion, and minor details of construction may be resorted to without departing from the principle or sacrificing any advantages of the invention.

What I claim is—

In a beehive, the hive-body provided with a central longitudinal partition dividing the interior of the body into separate compartments having front entrances, said partition being formed with a longitudinal slide-opening, extending inward from the front of the hive-body, a temporary imperforate closing-strip 5 adapted to be fitted over the entrance to the compartment forming the original brood-chamber, a perforate queen-excluding strip 10 fitted over the entrance to the other compartment which is originally empty, and a slide registering in the slide-opening of the partition 2 and formed with a transverse opening providing communication between the two compartments, said slide carrying a perforate queen-excluding strip covering the transverse opening of the slide and having a conical queen-trap, substantially as set forth.

In testimony that I claim the foregoing as my own I have hereto affixed my signature in the presence of two witnesses.

ALBERT ×his mark DUNCAN.

Witnesses:
OWEN DEVIS,
NOBLE ALEXANDER SIMONS.